Aug. 17, 1948.  A. R. HOLLOWAY  2,447,250
VEHICLE TOW BAR
Filed Sept. 9, 1947

INVENTOR.
Albert R. Holloway
BY
ATTORNEYS

Patented Aug. 17, 1948

2,447,250

UNITED STATES PATENT OFFICE 2,447,250

VEHICLE TOW BAR

Albert R. Holloway, West Palm Beach, Fla.

Application September 9, 1947, Serial No. 772,949

3 Claims. (Cl. 280—33.14)

1

This invention relates to new and useful improvements in towing devices and the primary object of the present invention is to provide a device which is pivotally mounted for horizontal movement at one end to a towing vehicle and pivotally mounted for vertical movement at its opposite end upon the bumper of a vehicle to be towed.

Another important object of the present invention is to provide a towing device embodying novel and improved means for attaching the same upon the bumper of a vehicle to be towed.

A further object of the present invention is to provide a device of the character described and is so designed as to permit the towed vehicle to be guided or steered by the movement of the towing vehicle, so that only the driver of the towing vehicle will be needed to conveniently tow a vehicle.

A still further aim of the present invention is to provide a towing device that is simple and practical in construction, strong and reliable in use, relatively inexpensive to manufacture, and otherwise well adapted for the purposes for which the same is intended.

Other objects and advantages reside in the details of construction, and operation as more fully hereinafter described and claimed, reference being had to the accompanying drawings forming part hereof, wherein like numerals refer to like parts throughout, and in which:

Figure 1:
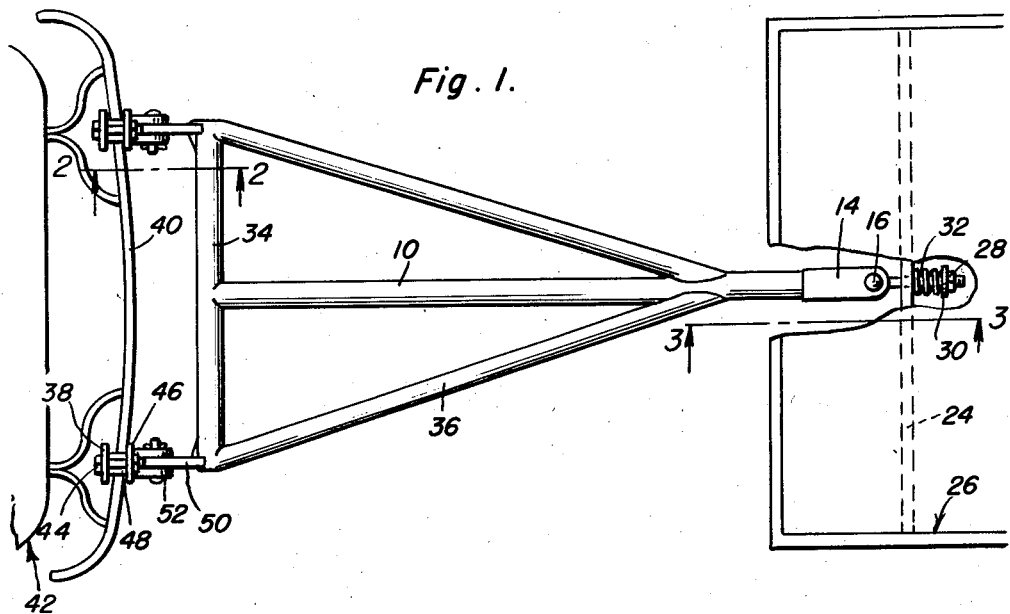
Figure 1 is a plan view of the present towing device attached to the bumper of the towed vehicle and the rear cross member of a towing truck, and with parts of the vehicle and truck broken away and shown in section.

Referring now to the drawings in detail, wherein for the purpose of illustration there is disclosed a preferred embodiment of the present invention, the numeral 10 represents a longitudinal bar notched as at 12 on opposite sides of its forward end to receive the rear terminals of a pair of spaced parallel horizontally disposed plates 14, which are rigidly secured by welding or the like in said notches.

Pivotally mounted between the outer forward

2 terminals of the plates 14 by a removable pivot pin 16, is the eye portion 18 of a coupling pin 20 that loosely extends through an aperture 22 provided in the rear cross member 24 of a towing truck 26. A nut 28 is threadedly engaged on the inner end of the pin 20 to limit the sliding movement of a retaining washer 30 mounted on the pin 20. A coil spring 32 carried by the pin 20 is biased between the inner face of the cross member 24 and the washer 32, to frictionally retain the eye 18 of the pin 20 in a normally horizontally adjusted position.

Rigidly secured by welding or the like to the rear terminal of bar 10, is the central portion of a transverse bar 34. The terminals of this bar 34 are rigidly secured to the rear terminal portions of forwardly converging bracing arms 36 that are fixedly secured adjacent the forward terminals of bar 10.

Figure 2:
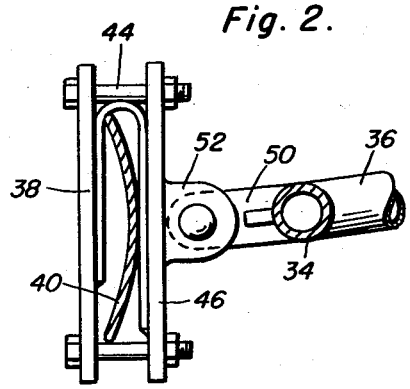
Figure 2 is an enlarged longitudinal vertical sectional view taken substantially on the plane of section line 2—2 of Figure 1.
Figure 3:
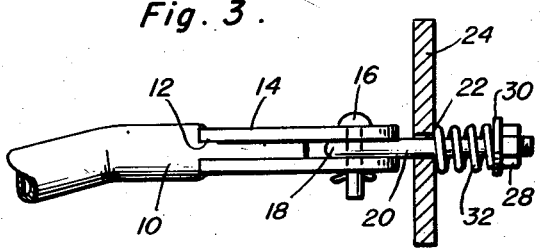
Figure 3 is an enlarged longitudinal vertical sectional view taken substantially on the plane of section line 3—3 of Figure 1.
Figure 4:
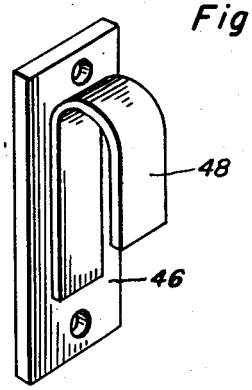
Figure 4 is a perspective view of one of the outer plates showing the bumper engaging member rigidly secured thereto.

A pair of substantially rectangular inner plates 38 are disposed adjacent the inner face of the forward bumper 40 of a vehicle to be towed 42, and these plates are adjustably connected by fasteners 44 to a pair of outer substantially rectangular plates 46 which are disposed adjacent the outer face or bumper 40. Interposed between the plates 38 and 46, are substantially U-shaped members 48 having one of their ends rigidly secured to the inner face of the outer plates 46. This member 48 engages bumper 40 as shown in Figure 2.

Projecting outwardly from the rear periphery of the bar 34 at each end thereof, is a pair of substantially flat vertically disposed extensions 50 that are pivotally mounted between spaced parallel vertical ears 52 that project outwardly from the outer plates 46.

In practical use of the device, when the towing vehicle starts or stops the spring 32 will tend to reduce the normal vibration occurring in the bars 10 and 34 which are transmitted to the towed vehicle. Also, the bar 10 may take various inclined angles as either of the vehicles rides over a rough portion in the road surface. Further, as the device is pivoted only to the towing vehicle for horizontal movement, the towing vehicle when turned or steered will cause the towed vehicle to follow the movement of the towing vehicle, whereby it will be necessary to provide only a driver for the towing vehicle in order to safely and readily tow a vehicle to a garage or the like.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A towing device comprising a longitudinal bar, a pair of spaced parallel horizontally disposed members projecting outwardly from the forward end of said longitudinal bar, a coupling pin removably carried by the rear cross member of a towing vehicle, an eye formed at the outer end of said pin, said eye pivotally mounted between said members, a transverse bar rigidly secured at its center to the rear terminal of said longitudinal bar, pairs of outer plates and inner plates adjustably mounted on opposite sides of a bumper of a vehicle to be towed, a bumper engaging member interposed between said outer and inner plates, said bumper engaging member being rigidly secured to the inner face of said outer plates, pairs of spaced parallel ears projecting outwardly from said outer plates, angular extensions projecting outwardly from the ends of said transverse member, means pivotally connecting said extensions between said ears, and bracing arms having their terminals rigidly secured to said transverse bar and said longitudinal bar.

2. The combination of claim 1 wherein said ears are vertically disposed.

3. The combination of claim 1 wherein said bracing arms are secured to the terminals of said transverse bar and the forward terminal of said longitudinal bar.

ALBERT R. HOLLOWAY.

REFERENCES CITED

The following references are of record in the file of this patent:

UNITED STATES PATENTS

| Number | Name | Date |
|---|---|---|
| 1,537,249 | Manley | May 12, 1925 |
| 2,001,408 | Burton | May 14, 1935 |
| 2,002,416 | Shafer | May 21, 1935 |
| 2,139,970 | Moore | Dec. 13, 1938 |
| 2,206,991 | Williams et al. | July 9, 1940 |
| 2,378,504 | Roos | June 19, 1945 |

FOREIGN PATENTS

| Number | Country | Date |
|---|---|---|
| 577,987 | Germany | June 8, 1933 |